United States Patent
Chun

(10) Patent No.: US 12,432,626 B2
(45) Date of Patent: Sep. 30, 2025

(54) COMMUNICATION METHOD VIA NETWORK SLICE

(71) Applicant: LG ELECTRONICS INC., Seoul (KR)

(72) Inventor: Sungduck Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 420 days.

(21) Appl. No.: 17/906,528

(22) PCT Filed: Mar. 30, 2021

(86) PCT No.: PCT/KR2021/003918
§ 371 (c)(1),
(2) Date: Sep. 16, 2022

(87) PCT Pub. No.: WO2021/201562
PCT Pub. Date: Oct. 7, 2021

(65) Prior Publication Data
US 2023/0136296 A1    May 4, 2023

(30) Foreign Application Priority Data

Mar. 31, 2020 (KR) .......................... 10-2020-0039181

(51) Int. Cl.
*H04W 36/00* (2009.01)
*H04W 36/12* (2009.01)
(Continued)

(52) U.S. Cl.
CPC ....... *H04W 36/0058* (2018.08); *H04W 36/12* (2013.01); *H04W 36/326* (2023.05); *H04W 76/30* (2018.02)

(58) Field of Classification Search
CPC ............. H04W 36/0058; H04W 36/12; H04W 36/326; H04W 76/30; H04W 36/13; H04W 76/38; H04W 88/18
See application file for complete search history.

(56) References Cited

U.S. PATENT DOCUMENTS

| 10,820,185 B2 * | 10/2020 | Faccin ................. H04W 76/27 |
| 2018/0199398 A1 * | 7/2018 | Dao ....................... H04W 76/27 |
| 2021/0219354 A1 * | 7/2021 | Babbellapati ......... H04W 48/16 |

FOREIGN PATENT DOCUMENTS

| KR | 2019-0140938 | 12/2019 |
| KR | 2020-0004371 | 1/2020 |

OTHER PUBLICATIONS

3GPP; TSG SA; Procedures for the 5GS; Stage 2 (Release 16), 3GPP TS 23.502 V16.4.0 (Mar. 2020) (Year: 2020).*
(Continued)

*Primary Examiner* — Sujoy K Kundu
*Assistant Examiner* — Samuel Dilan Rutnam
(74) *Attorney, Agent, or Firm* — LEE, HONG, DEGERMAN, KANG & WAIMEY

(57) ABSTRACT

One disclosure of the present specification provides a method for performing communication by a user equipment (UE). The method comprises the steps of: receiving, from a network, a first message indicating that connection between the UE and a first network slice used by the UE is released, wherein the first message includes time information about a time when the connection is released; and on the basis of the first message, transmitting, to an application of the UE, a second message indicating that the connection is released. The second message includes the time information, and the UE may drive the application by using the first network slice.

8 Claims, 12 Drawing Sheets

(51) Int. Cl.
 H04W 36/32 (2009.01)
 H04W 76/30 (2018.01)

(56) References Cited

OTHER PUBLICATIONS

PCT International Application No. PCT/KR2021/003918, International Search Report dated Jun. 28, 2021, 4 page.
3rd Generation Partnership Project, "Technical Specification Group Services and System Aspects; Procedures for the 5G System (5GS); Stage 2 (Release 16)," 3GPP TS 23.502 V16.4.0, Mar. 2020, 584 pages.
Motorola Mobility et al., "Solution to KI#1, KI#2 and KI#4 on monitoring multiple quotas of network slice attributes at NWDAF," S2-2001651, SA WG2 Meeting #S2-136AH, Jan. 2020, 10 pages.
Apple et al., "Solution for Key Issue #2: Deactivated PDU Session release for efficient PDU Session quota management," S2-2001477, SA WG2 Meeting #136-AH, Jan. 2020, 6 pages.

* cited by examiner

COMMUNICATION METHOD VIA NETWORK SLICE

CROSS-REFERENCE TO RELATED APPLICATION(S)

This application is the National Stage filing under 35 U.S.C. 371 of International Application No. PCT/KR2021/003918, filed on Mar. 30, 2021, which claims the benefit of earlier filing date and right of priority to Korean Application No. 10-2020-0039181, filed on Mar. 31, 2020, the contents of which are all hereby incorporated by reference herein in their entireties.

TECHNICAL FIELD

The present specification relates to mobile communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In the network slice technology, when the UE makes a service request for a required network slice, but the corresponding network does not provide the service for the network slice, a method is required for the UE to efficiently receive the service for the network slice.

SUMMARY

The AMF may be provided with UE information and network slice information from the UDM, and may provide the UE with information about the network slice required by the UE.

The present specification may have various effects.

For example, through the procedure disclosed in the present specification, the UE may be provided with a service for safely and effectively releasing the connection to the network slice.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

DETAILED DESCRIPTION

Figure 1:
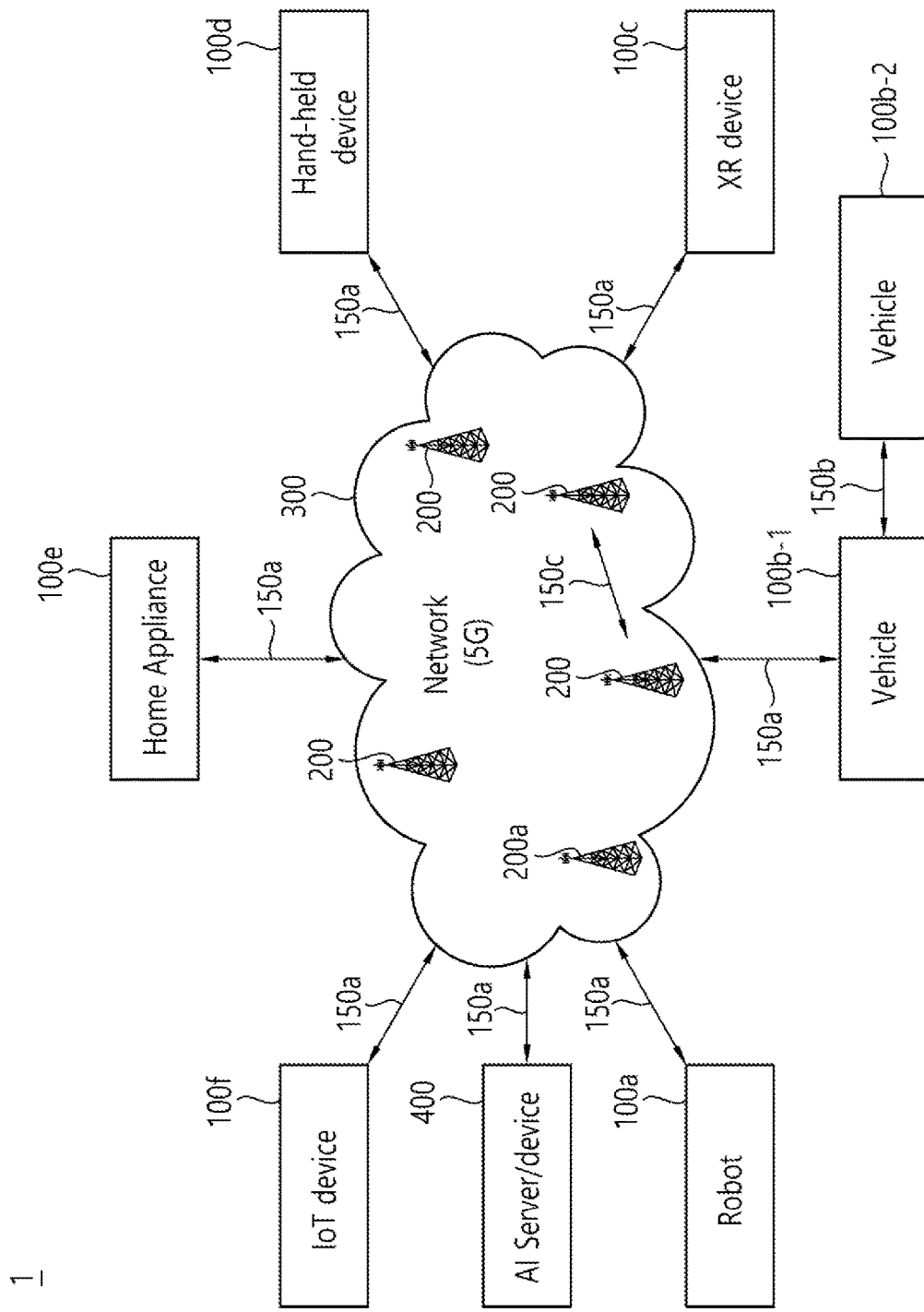
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
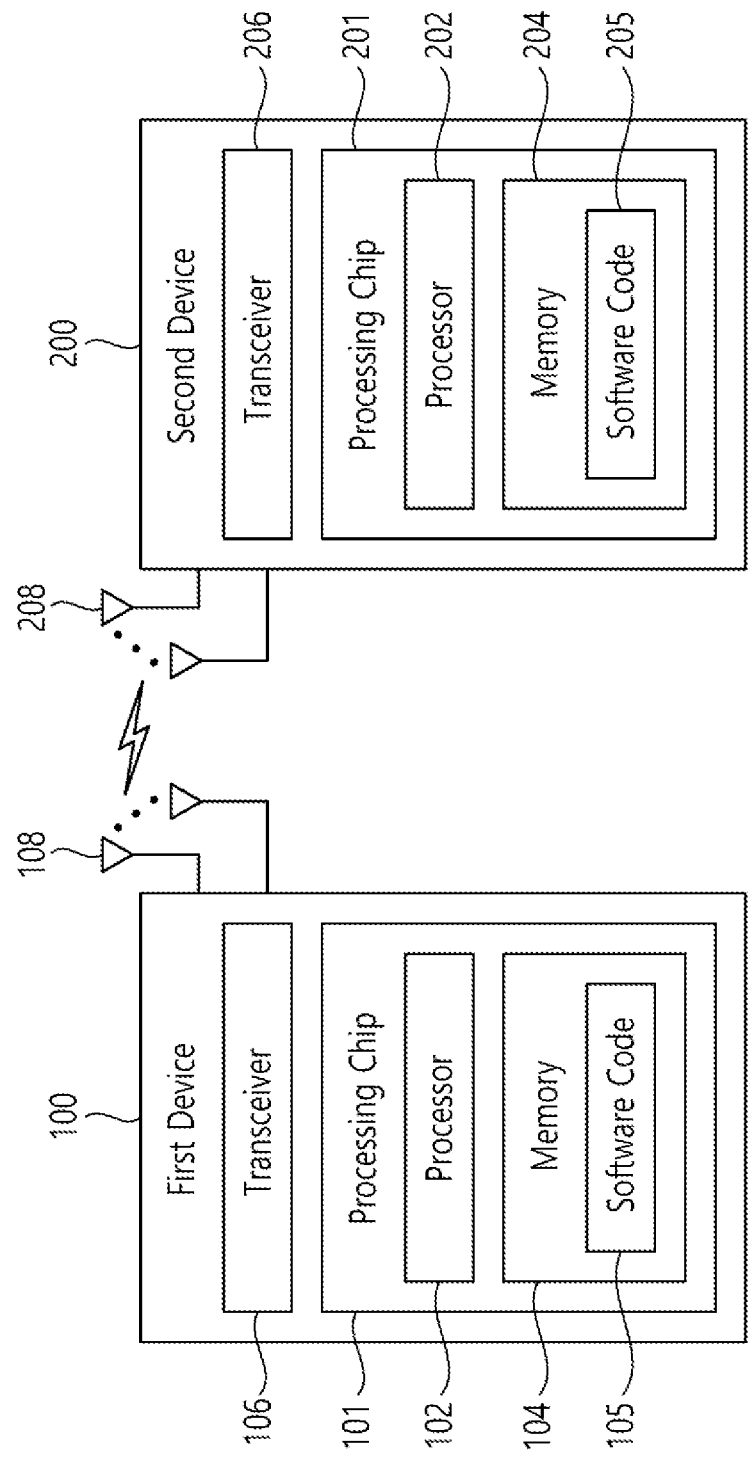
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
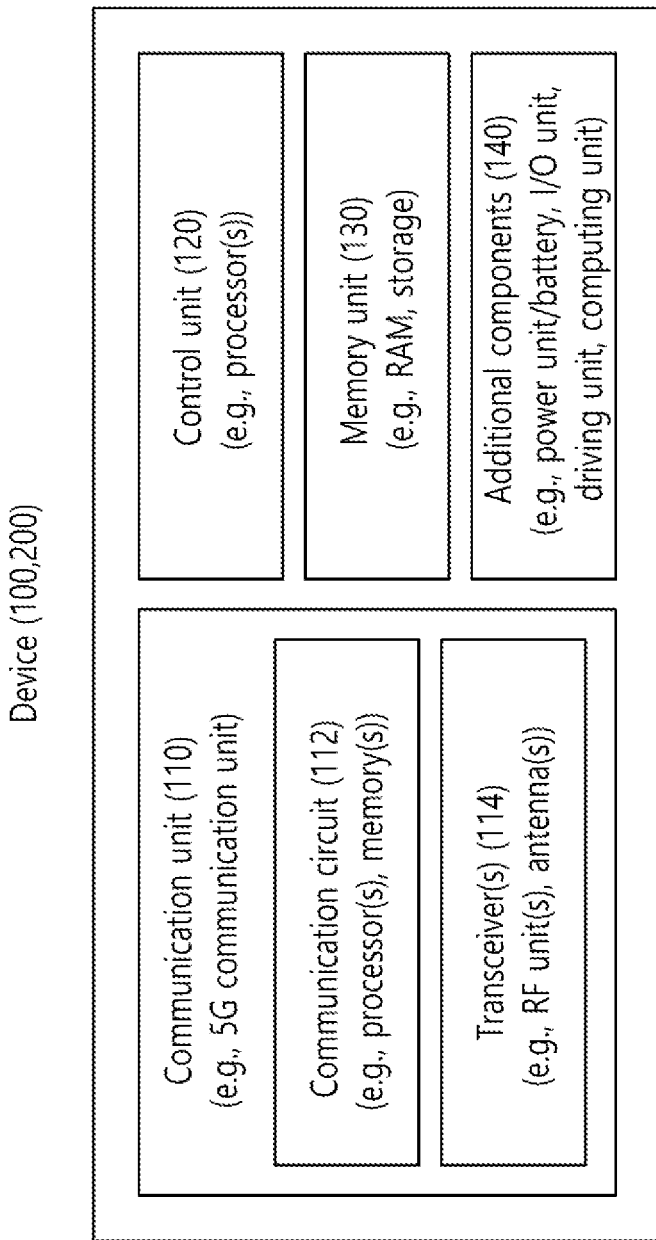
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
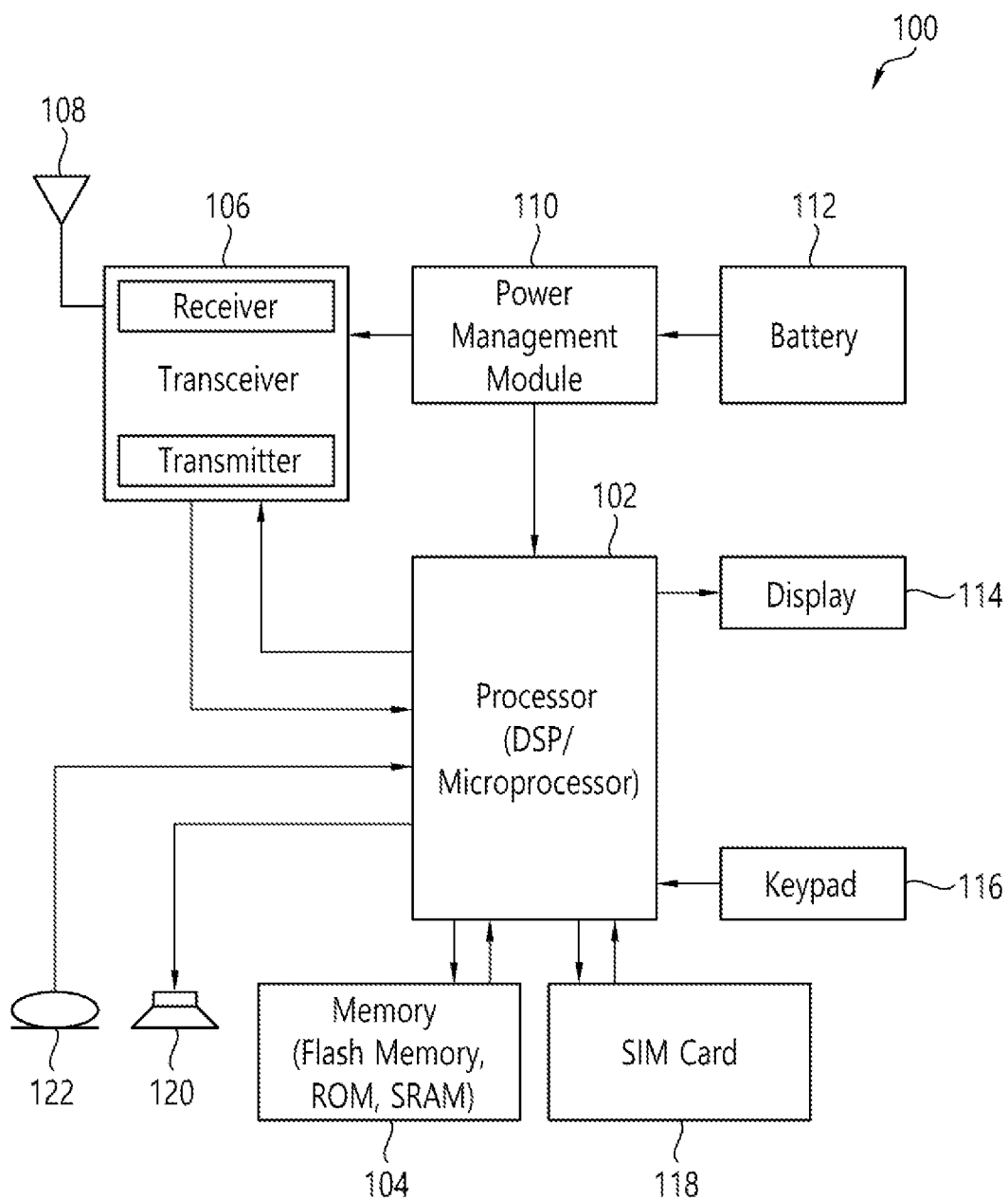
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

<Cell Selection and Re-Selection>

In the mobile communication system, it is assumed that the UE continuously moves, and accordingly, in order to maintain the radio section between the UE and the base station in an optimal state, the UE may continuously perform a cell selection/reselection process.

For reselection, the UE may perform evaluation of cells. When evaluating Srxlev and Squal of non-serving cells for reselection evaluation purposes, the UE shall use parameters provided by the serving cell and for the final check on cell selection criterion, the UE shall use parameters provided by the target cell for cell reselection.

The NAS can control the RAT(s) in which the cell selection should be performed, for instance by indicating RAT(s) associated with the selected PLMN, and by maintaining a list of forbidden registration area(s) and a list of equivalent PLMNs. The UE shall select a suitable cell based on RRC_IDLE or RRC_INACTIVE state measurements and cell selection criteria.

In order to expedite the cell selection process, stored information for several RATs, if available, may be used by the UE.

When camped on a cell, the UE shall regularly search for a better cell according to the cell reselection criteria. If a better cell is found, that cell is selected. The change of cell may imply a change of RAT.

The NAS is informed if the cell selection and reselection result in changes in the received system information relevant for NAS.

Measurements for cell reselection have the following rules.

If the serving cell fulfils Srxlev>SIntraSearchP and Squal>SIntraSearchQ, the UE may choose not to perform intra-frequency measurements.

Otherwise, the UE shall perform intra-frequency measurements.

The UE shall apply the following rules for NR inter-frequencies and inter-RAT frequencies which are indicated in system information and for which the UE has priority For a NR inter-frequency or inter-RAT frequency with a reselection priority higher than the reselection priority of the current NR frequency, the UE shall perform measurements of higher priority NR inter-frequency or inter-RAT frequencies For a NR inter-frequency with an equal or lower reselection priority than the reselection priority of the current NR frequency and for inter-RAT frequency with lower reselection priority than the reselection priority of the current NR frequency:

If the serving cell fulfils Srxlev>SnonIntraSearchP and Squal>SnonIntraSearchQ, the UE may choose not to perform measurements of NR inter-frequencies or inter-RAT frequency cells of equal or lower priority;

Otherwise, the UE shall perform measurements of NR inter-frequencies or inter-RAT frequency cells of equal or lower priority.

<Network Slice>

Figure 5:
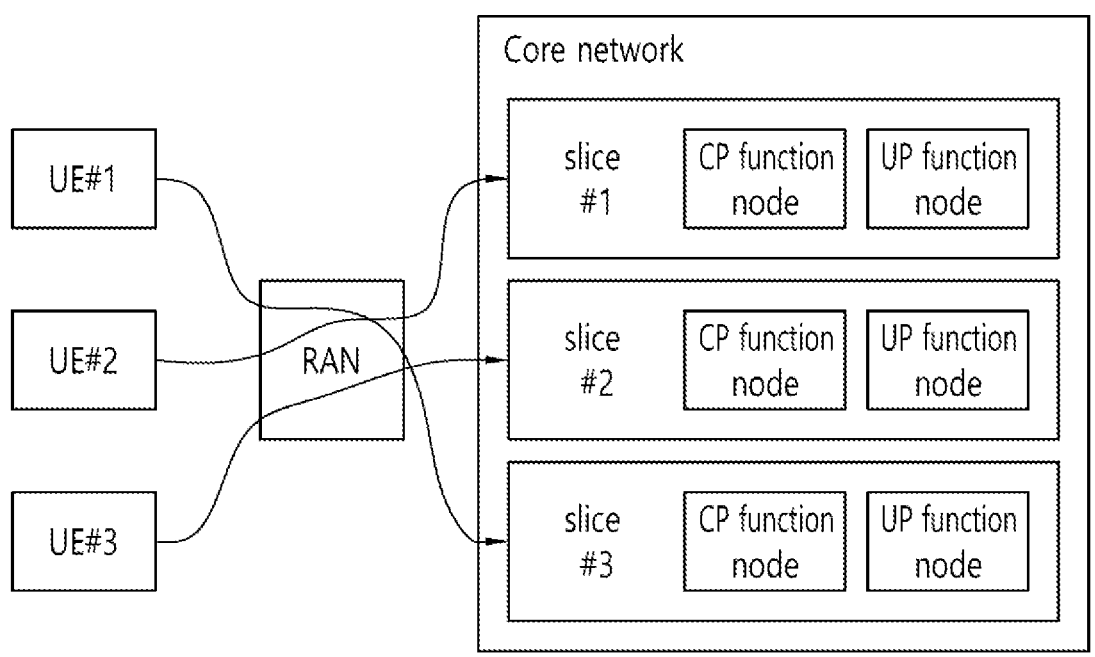
FIG. 5 is an exemplary diagram illustrating an example of an architecture for implementing the concept of network slicing.

FIG. 5 is an exemplary diagram illustrating an example of an architecture for implementing the concept of network slicing.

As can be seen with reference to FIG. 5, the core network CN may be divided into several slice instances. Each slice instance may include one or more among a CP function node and a UP function node.

Each UE may use a network slice instance suitable for its own service through an access network (AN).

FIG. 5, each slice instance may share one or more of a CP function node and a UP function node with another slice instance. This will be described with reference to FIG. 5 as follows.

Figure 6:
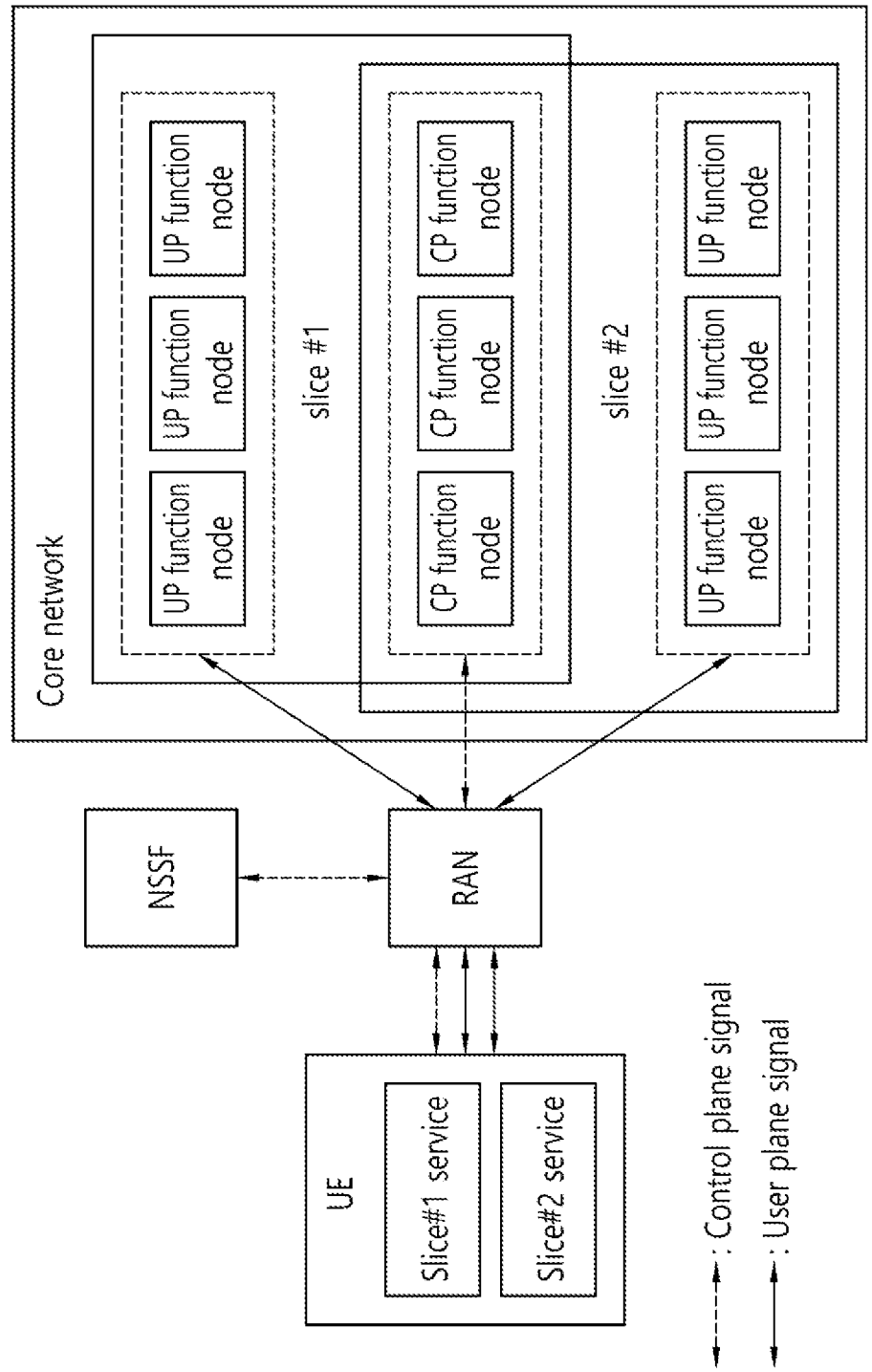
FIG. 6 is an exemplary diagram illustrating another example of an architecture for implementing the concept of network slicing.

FIG. 6 is an exemplary diagram illustrating another example of an architecture for implementing the concept of network slicing.

Referring to FIG. 6, a plurality of UP functional nodes are clustered, and similarly, a plurality of CP functional nodes are also clustered.

And, referring to FIG. 6, slice instance #1 (or referred to as instance #1) in the core network includes the first cluster of UP functional nodes. And, the slice instance #1 shares a cluster of CP functional nodes with slice #2 (or called instance #2). The slice instance #2 includes a second cluster of UP functional nodes.

The illustrated Network Slice Selection Function (NSSF) selects a slice (or instance) that can accommodate the service of the UE.

The illustrated UE may use service #1 through the slice instance #1 selected by the NSSF, and may use service #2 through the slice instance #2 selected by the NSSF.

In order for a UE to simultaneously use a plurality of services through a plurality of network slice instances by one network operator, an architecture, which allows a set (or cluster) of CP control nodes to be shared among several slice instances, is proposed. This will be described with reference to FIG. 7 as follows.

Figure 7:
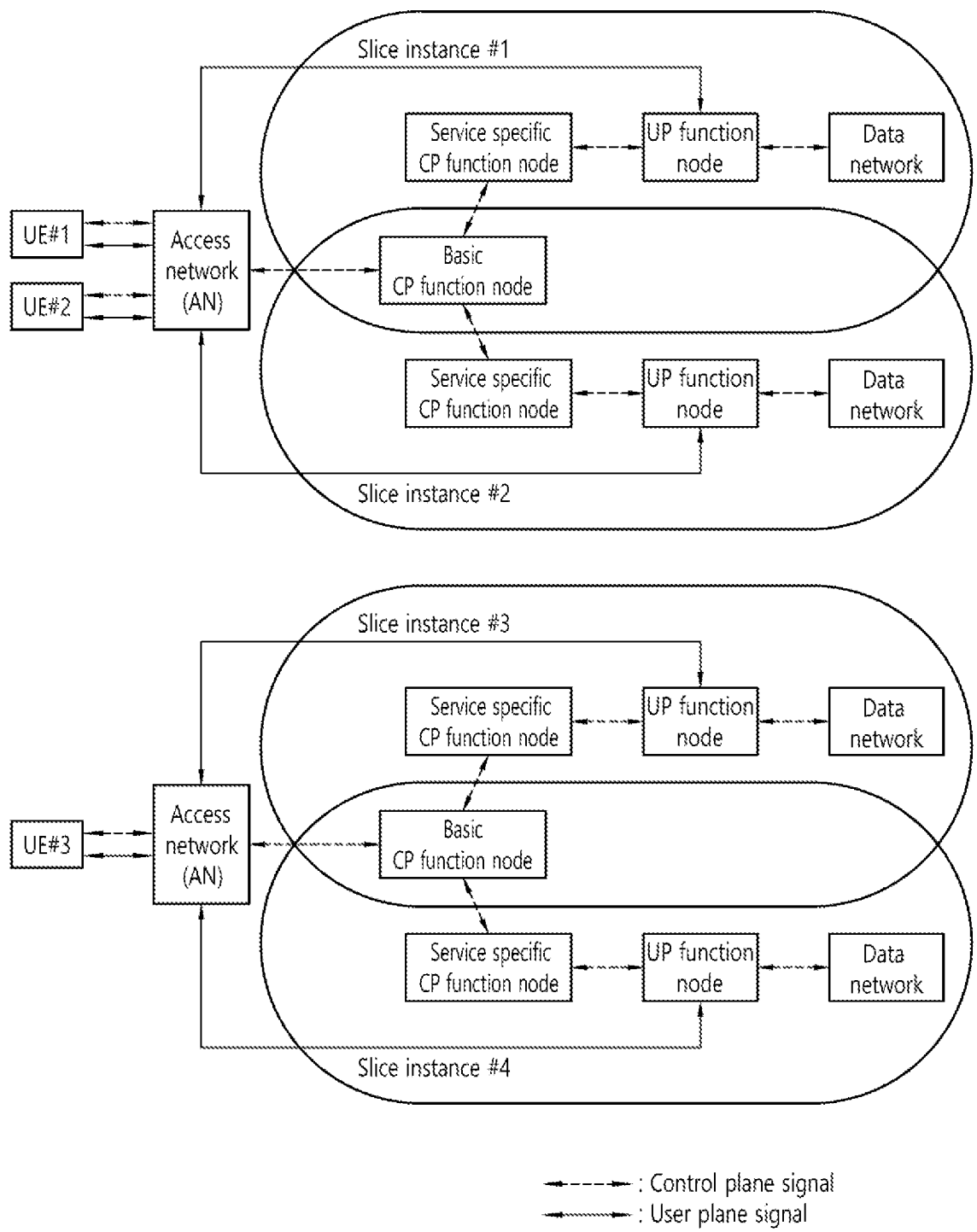
FIG. 7 is an exemplary diagram illustrating an architecture for implementing the concept of network slicing.

FIG. 7 is an exemplary diagram illustrating an architecture for implementing the concept of network slicing.

As can be seen with reference to FIG. 7, in order for each UE to use a service through a plurality of slice instances, a basic CP function node may be shared between slice instances.

Each slice instance may include a service-specific CP function node and a UP function node, and a basic CP function node that can be shared with other slice instances.

A plurality of the service-specific CP function nodes may be gathered and bundled into one cluster (i.e., a set). Similarly, a plurality of the UP functional nodes may also be grouped into one cluster (i.e., a set).

Each slice instance may be dedicated for UEs belonging to the same type.

The basic CP function node may allow the UE to enter the network by performing authentication and subscription verification. In addition, the basic CP functional node may manage the mobility of the UE for each characteristic (e.g., low mobility or high mobility, etc.).

The service specific CP function node manages the session.

Meanwhile, when the UE first accesses the operator's network, the basic CP function node is selected in the access network (AN). The selection may be performed according to information of the UE (e.g., usage type of the UE).

If there is a session request from the UE when the UE performs the initial attach or after performing the attaching, the slice instance selection function may be triggered in the core network to select the service specific CP function node and the UP function node. This selection may be performed based on subscriber information and information related to the session request from the UE (e.g., the type of service requested, information such as APN).

When the selection of the service specific CP function node and the UP function node is configured as a default in the core network, the selection may be performed even without a session request from the UE. In this case, if there is a network slice instance configured as a default, it is assigned to the UE.

The UE may have multiple sessions through one slice instance or multiple slice instances. When the UE requests a session, the node in charge of the slice selection function determines which slice instance can support the session requested by the UE. The determined slice instance is assigned for the session.

Meanwhile, the UE may be connected to a plurality of slice instances through different basic CP functional nodes.

On the other hand, the core network may decide to change the default CP function node for the UE for various reasons (e.g., network management problems, UE's subscription information change, UE's location change, etc.). For this, the core network may request a detach/re-attach from the UE. Accordingly, when the UE reconnects to the network, the access network may select another primary CP function node.

Problems to be Solved in the Disclosure of this Specification

Through the support of network slices, an operator can classify each service subscriber according to a certain standard or business purpose, and in particular, according to the characteristics of each subscriber group, the operator can provide a service by designating different network slices.

For example, the network may bundle subscribers belonging to a specific campus and may allocate a network slice for them, or may allocate a network slice for communication between a UE group associated with a specific hardware or, for example, UEs mounted on a specific car model. In this case, the specific slice may be used only by users permitted to access the slice.

In this process, the UE (or subscriber, user) may subscribe to several different network slices. For example, a user may subscribe to a network slice A for campus, a slice B assigned to their apartment complex, and a network slice C for the navigation of their vehicle.

In this case, the UE can simultaneously request and use network slices that need to be used according to its activated application.

However, from the perspective of a network that needs to support a large number of users, when a large number of network slices exist, the network may provide a communication network according to the purpose of each network slice. In addition, there may be a requirement to maximize the available time of network slices requested by each UE.

In particular, as the 5G system is advanced and the number of UEs requiring ultra-delay ultra-reliable access such as factory machines increases, the network slice must be available only on a specific frequency or a specific area, or the network must not be affected by other network slices. To this end, the network operator wants each network slice to be available in a specific region or only in a specific region.

Figure 8:
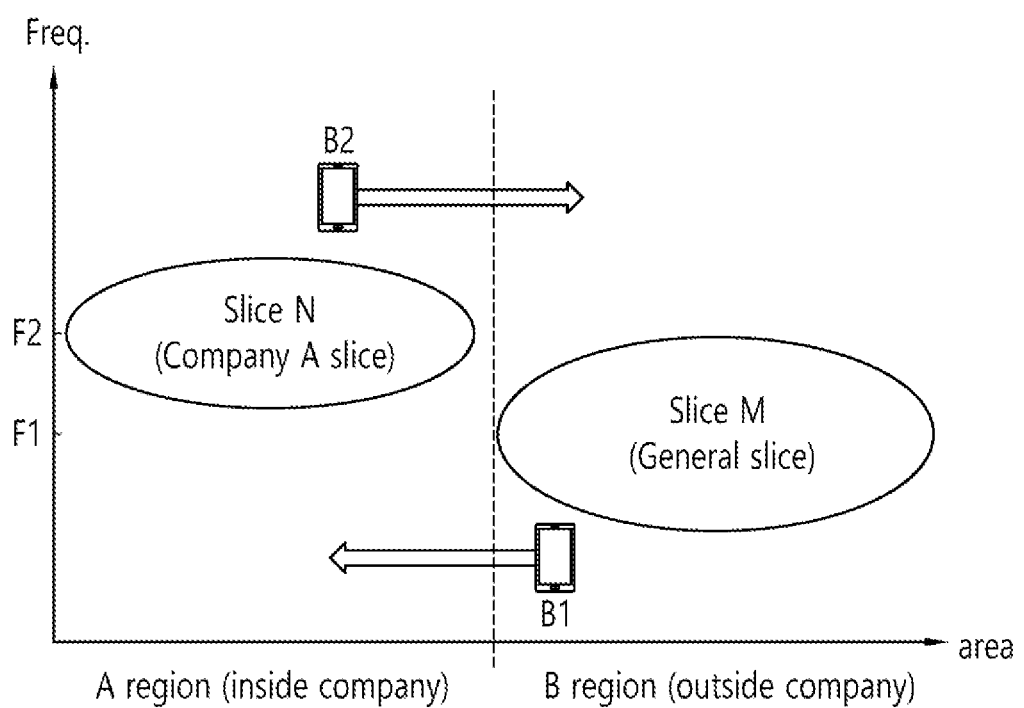
FIG. 8 shows an example of a network slice according to region.

FIG. 8 shows an example of a network slice according to region.

B1 and B2 may be UE of employees of the company (company A) in area A. Network slice N may be a network slice of company A, and network slice M may be a general network slice.

Company A may allow its employees to use the network slice N provided by the company while inside the company, while disallowing the use of network slice N outside the company.

B1 and B2 may be personal UEs of employees. Therefore, even outside the company, B1 and B2 may want to use the communication service. B1 and B2 may subscribe to a general network slice service called network slice M.

B2 may be using application 1 through network slice N in region A. B2 may move from region A (region in which network slice N is provided) to region B (region in which network slice M is provided). If the Application 1 is to deal with Company A's confidential information, Company A would want to not be able to use Application 1 in region B, which is outside the company. In addition, in terms of protecting company information, when the UE is connected to the network slice N, the UE may be configured to prevent simultaneous access to other network slices.

With the introduction of the smart factory, an innovation is taking place in which workers do not directly operate the machine in front of the machine, but operate the UE from a remote location, and the commands of the UE operate the machine far away. In this way, B2 may operate the machine remotely. B2 can move from Area A to Area B while operating the machine remotely using the network slice N to which the company's machines are connected. In this case, the communication service of network slice N may be abruptly cut off, preventing B2 from sending commands to the mechanical device. If the mechanical device is doing dangerous work such as cutting/welding, there is a problem that the sudden disconnection of communication can lead to an industrial accident.

For example, the network slice M may be set not to transmit data of the application 1. As soon as B2 passes the boundary from area A to area B, network slice M starts to be provided to B2. At this time, network slice N is released in B2, and problem that application 1 suddenly cannot transmit and receive data occurs.

Disclosure of the Present Specification

The disclosures described below in this specification may be implemented in one or more combinations (e.g., a combination including at least one of the contents described below). Each of the drawings shows an embodiment of each disclosure, but the embodiments of the drawings may be implemented in combination with each other.

The description of the method proposed in the disclosure of the present specification may consist of a combination of one or more operations/configurations/steps described below. The following methods described below may be performed or used in combination or complementary.

It has been prepared to describe a specific example of the present specification. Since the names of specific devices described in the drawings or the names of specific signals/messages/fields are presented by way of example, the technical features of the present specification are not limited to the specific names used in the following drawings.

The following drawings were created to explain a specific example of the present specification. Since the names of specific devices described in the drawings or the names of specific signals/messages/fields are presented by way of example, the technical features of the present specification are not limited to the specific names used in the following drawings.

1. First Disclosure

Figure 9:
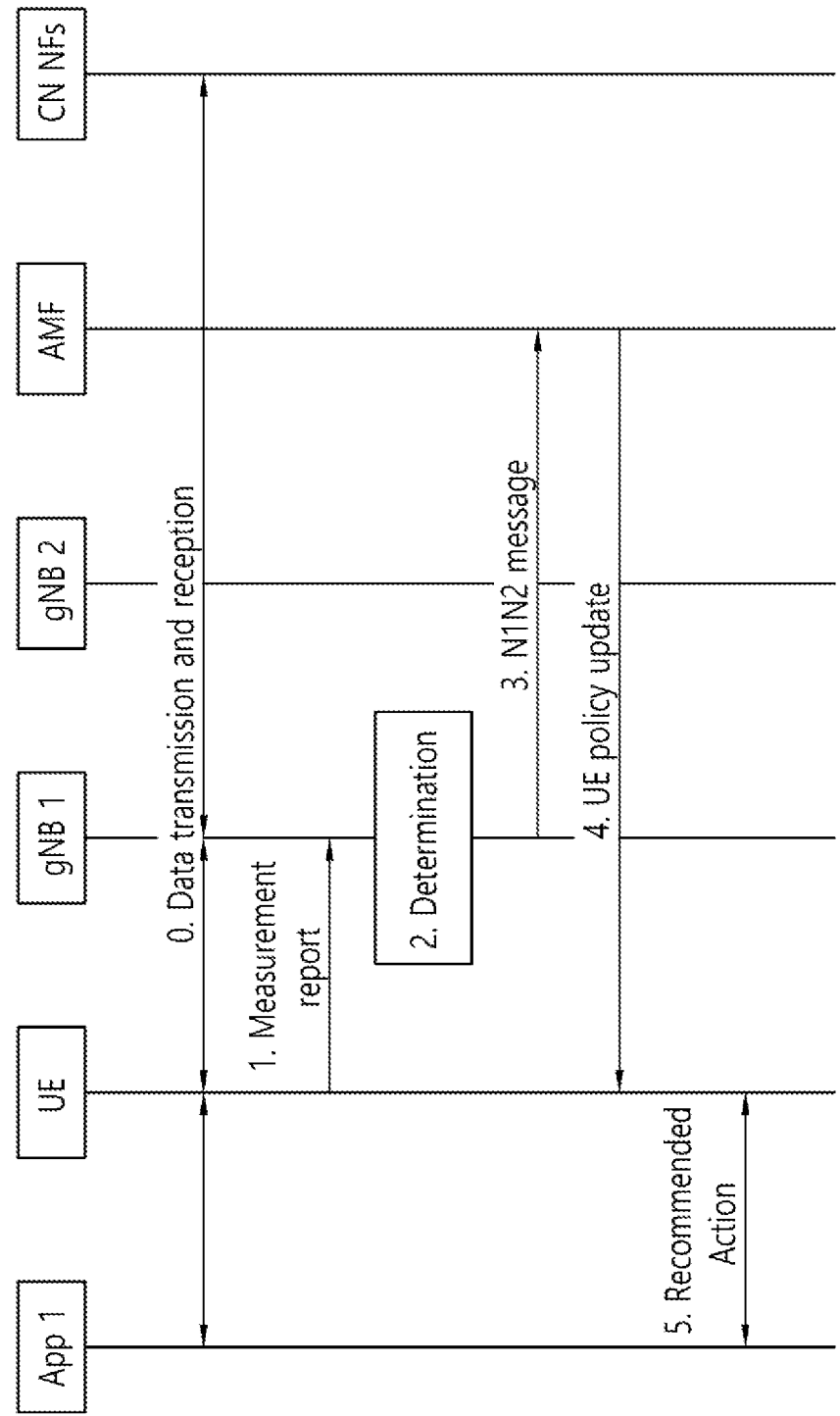
FIG. 9 shows a first disclosure of the present specification.

FIG. 9 shows a first disclosure of the present specification.
0. The UE may use the application 1 by using the base station 1 and the network slice 1 of the core network. The UE may send and receive data using the application 1. The UE may be currently located in region A, region A may be managed by base station 1, and application 1 may use network slice 1. Data may be exchanged with the core network through the UE in the application.
1. The base station 1 may configure the measurement for the UE. The UE may continuously perform measurement according to this configuration, and when a certain condition is satisfied, the UE may report the measurement result to the base station 1.
2. The base station 1 may analyze the measurement result received from the UE.

The base station (base station 1) may manage information on information (frequency/region/radio strength) of an area in which it is being processed for each network slice. Based on this information, the base station may recognize that the UE approaches an area in which a specific network slice (network slice 1) can no longer be provided.

When the UE leaves the wireless network area of the base station 1 soon, the base station 1 may determine whether the network slice 1 provided to the UE can continue to be provided in the area to which the UE will move. In addition, the base station 1 may determine the time information (release time) for how long the base station 1 can provide the network slice 1 to the UE.

In addition, the base station may determine when the UE performs handover (etc.), according to the measurement result reported from the UE.

3. If the base station 1 determines that it is difficult to provide network slice 1 in a new area as a result of step 2, the base station 1 may inform the core network (AMF) of the result. For example, the UE of the base station 1 is using the network slice 1, and according to the report of the measurement result of the UE, the UE may gradually move away from the wireless network area of the base station 1. In particular, when there is no cell providing the network slice 1 around the wireless network area of the base station 1, the base station 1 may inform the core network that the UE may soon leave area for the network slice 1. In addition, the base station 1 may notify the UE that the network slice 1 may be released soon. It is possible to deliver information on the time (release time) when the connection to the network slice 1 of the core network is released.

AMF notifies SMF/UPF, etc. that the network slice of the UE may be released soon.
4. When the core network (AMF) receives the result from the base station 1, the AMF may transmit a notification message including information that the network slice 1 can no longer be provided to the UE. That is, when the core network releases or de-activates network slice 1 for the UE, the core network may transmit a notification message to the UE. The notification message may include information on when the connection to the network slice 1 will be released. Additionally, the AMF may transmit to the UE whether data transmission of application 1 should be stopped. In addition, the AMF may indicate through which network slice to transmit after release of the network slice 1. That is, the network may transmit information on network slice 2 that may be provided to the UE, and may transmit information on whether the application 1 can be operated through the network slice 2.

While notifying the release of network slice 1, the core network may inform what action the UE should take based on the following information.

Information on applications (application 1) currently running in the UE: QoS requirements, region restriction information, etc.
Information on the network slice to be released (network slice 1)
if there is a network slice that can be newly provided to the UE, information on the network slice
Information on frequencies set for each network slice
Information on frequency support of each UE The UE may access the base station 2 in the new area, and may be provided with the network slice 2 in the new area. In this case, the AMF may transmit information on whether the UE can transmit and receive data of the application 1 using the network slice 2 to the UE.

In addition, the AMF may deliver information on a network slice to which the UE subscribes or a network slice permitted to the UE to the base station 1.

(1) When the UE Cannot Use Application 1 by Connecting to Network Slice 2

There may be case where there is no a network slice (network slice 2), which can satisfy QoS (latency, date rate, etc.) requirements of applications (application 1) operating in a network slice (network slice 1) to be released soon, among network slices that can be provided to a UE in a new area or there may be case where the application 1 cannot be provided to the UE in a new area (provided only in a specific area). In this case, the UE cannot use the application 1 by connecting to the network slice 2. That is, the UE cannot use application 1 anymore.

The AMF may transmit to the UE that the connection to network slice 1 may be released.

The AMF may transmit information indicating that data transmission of application 1 should be stopped to the UE. The AMF may instruct the UE to no longer request data transmission to the network for the corresponding application (application 1) using the corresponding network slice (network slice 1).

Such information (or instructions) may be transmitted through a notification or release message. In addition, the AMF may transmit information (release time) on when the connection to the network slice 1 will be released to the UE.

i) A case (where the network does not send the information that the network slice 2 is allowed to be used for the application 1) and ii) a case (where the network instructs to use only the network slice 1 for the application 1) may be same with a case where the network instructs not to transmit data for the application 1 in a new area. These cases may be included the described above case where the UE cannot use the application 1 via the network slice 2.

(2) When the UE can Use Application 1 by Connecting to Network Slice 2

There may be case where there is a network slice (network slice 2), which can satisfy QoS (latency, date rate, etc.) requirements of applications (application 1) operating in a network slice (network slice 1) to be released soon, among network slices that can be provided to a UE in a new area or there may be case where the application 1 can be provided to the UE in a new area (provided only in a specific area). In this case, the UE can use the application 1 by connecting to the network slice 2.

In this case, the core network (AMF) may instruct the UE to move from the network slice (network slice 1) to another network slice (network slice 2) for the application (application 1).

The AMF may inform the UE that the application 1 can be used through the network slice 2 in the new area.

5. The UE may notify the application 1 based on the message received from the AMF.

(1) When the UE Cannot Use Application 1 by Connecting to Network Slice 2

The UE may notify the application that the network slice 1 will be released soon, and may stop data transmission for the application. When application 1 is installed for controlling the machine in the UE, application 1 may transmit, to the application installed in the machine being controlled, information indicating that it can no longer control the machine. Alternatively, application 1 may release the connection with the application installed on the machine. In addition, the application 1 may transmit information (release time) about the time the connection is maintained to the application installed in the machine.

The UE may deliver information (release time) on how long the UE's connection to the network slice 1 is maintained (when released) to the application 1. Through this process, the application can know when to take the action to terminate the application.

The UE may follow the instructions or configuration of the AMF included in the received message.

When the application 1 receiving the message from the UE is notified that communication may be cut off due to the release of the network slice 1, it may enter the procedure of finishing the operation currently in progress.

(2) When the UE can Use Application 1 by Connecting to Network Slice 2

The UE may adjust the parameters according to QoS provided by the network slice 2. For example, it is possible to change its own data generation interval based on information such as latency.

2. Second Disclosure

Figure 10:
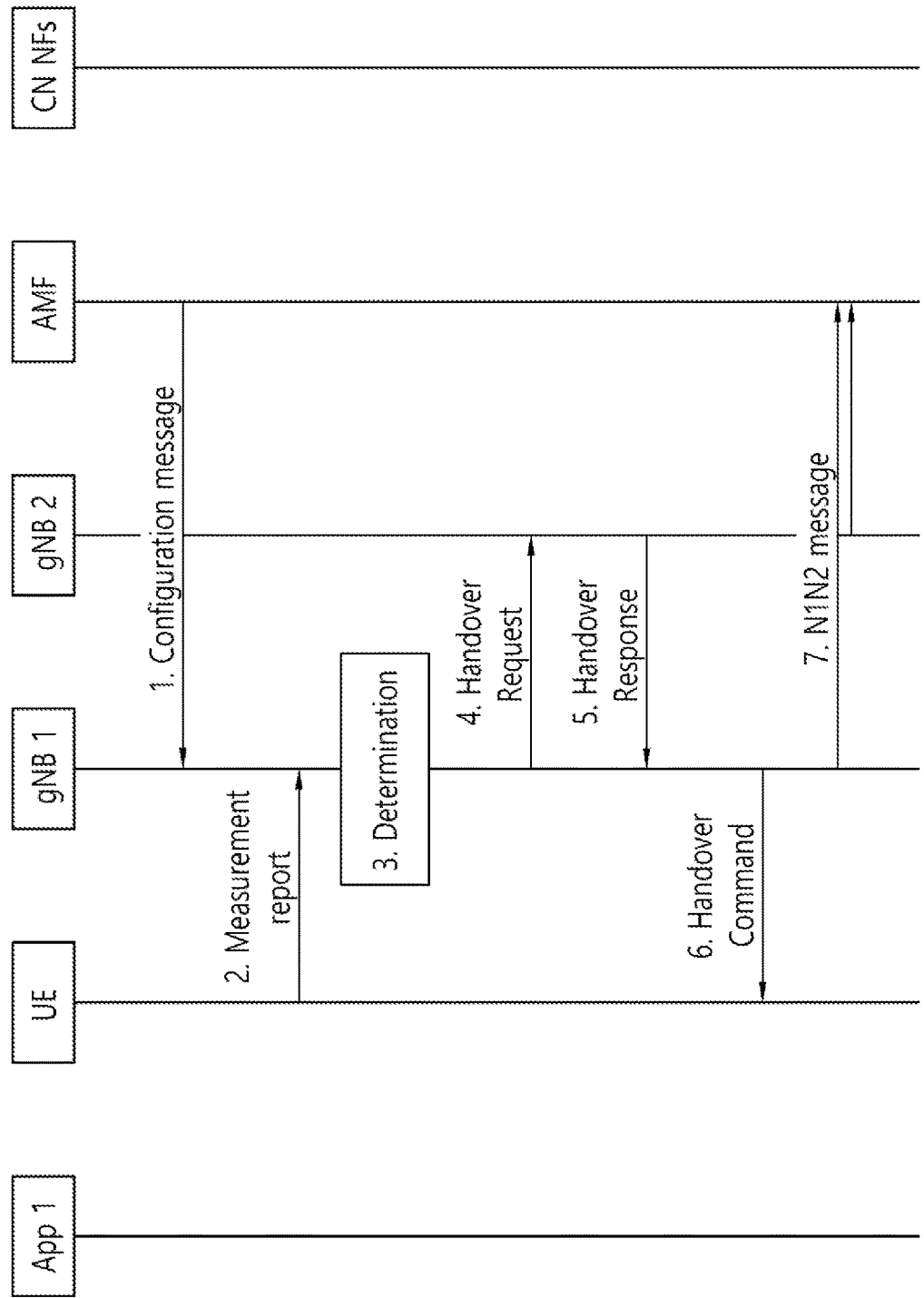
FIG. 10 shows a second disclosure of the present specification.

FIG. 10 shows a second disclosure of the present specification.

The UE is located in region A managed by base station 1, and only network slice 1 may be provided in region A. Region B may be managed by base station 2, and only network slice 2 may be provided in region B. The UE may send a service provision request for network slices necessary for the network in a registration process, etc. The UE may request network slice 1 and network slice 2.

Network slice 1 and network slice 2 may have a relationship that cannot be provided to the UE at the same time. In this case, even if both network slices are allowed, only one network slice can be activated. When only network slice 1 is activated, the network may inform the UE that network slice 2 is not activated due to network slice 1. In addition, the network may store information that network slice 2 is also requested by the UE but is not activated due to network slice 1.

1. When the UE starts communication, the core network (AMF) may transmit configuration information for the UE to the base station 1. In this process, the core network may deliver information about the network slices requested by the UE to the base station 1. That is, when the UE requests network slice 1 and network slice 2, even if only network slice 1 is supported in the corresponding region (region A), information that the UE has also requested network slice 2 may be transmitted to the base station. The AMF may deliver information on the network slice (network slice 2) that is permitted to the UE but is in a paused state due to the currently ongoing network slice (network slice 1) to the base station 1. In this process, the core network (AMF) may deliver information that the use of the network slice 2 is also allowed to the base station 1. In addition, the core network (AMF) may transmit information that activation is (or was) impossible because the network slice 2 cannot be simultaneously provided with the network slice 1 currently being used even when requested by the UE. The core network may instruct the base station 1 to activate only the network slice 1 to provide a communication service to the UE.

2. The base station 1 may configure the measurement for the UE. The UE may continuously perform measurement according to this configuration, and when a certain condition is satisfied, the UE may report the measurement result to the base station 1.

3. Base station 1 may perform analysis on the UE according to the measurement result received from the UE. The base station 1 may determine whether or not the UE can continue to use network slice 1 when the UE leaves the area (region A) of the base station 1 soon, and the base station 1 may determine whether or not the UE can continue to use network slice 1 in the area (area B) to which the UE is newly moved.

Region B cannot provide network slice 1 and may be able to provide only network slice 2. In this case, the following operations may be performed.

The base station 1 (the source radio access network) may inform the UE that the network slice 1 will be released soon and the network slice 2 may be provided.

The base station 1 (source radio access network) may request a handover for the UE to the base station 2 (target radio access network). In this process, the base station 1 may transmit to the base station 2 information that the UE is using network slice 1, information that network slice 2 is allowed, and information that the UE has requested network slice 2.

Base station 2 (target radio access network) may inform base station 1 (source access network) that handover is impossible for a PDU session and bearer related to network slice 1.

Alternatively, the base station 2 may recognize that the UE has requested the network slice 2, and may return information that the handover is possible to the base station 1 (source access network). Accordingly, the base station 1 may decide to handover of the UE to the base station 2. The base station 1 (source access network) may handover the UE to the network (target access network) of the base station 2. In this process, the resource for the network slice 1 may be deleted by a handover command.

If there is no information that the UE has requested network slice 2, or if the base station 2 does not support network slice 2, the base station 2 (target access network) rejects handover to base station 1 (source access network).

4. If the base station 1 decides to handover the UE to the base station 2, the base station 1 may transmit information on the network slice (network slice 1) currently used by the UE to the base station 2.

If there is a network slice (network slice 2) that is not currently provided among the network slices (network slices 1 and 2) previously requested by the UE, information on this may be transmitted to the base station 2.

5. The base station 2 may recognize that the UE has previously requested network slice 2. Accordingly, the base station 2 may determine whether the base station 2 can provide the network slice 2 to the UE. If the base station 2 can provide the network slice 2 to the UE, the base station 2 may transmit the handover response message to the base station 1 by including information indicating that the network slice 2 can be provided in the handover response message while starting radio resource configuration for this.

6. The base station 1 may recognize that handover is possible. The base station 1 may instruct the UE to perform handover to base station 2.

7. A base station (base station 2) capable of providing network slice 2 may inform the core network that it can provide network slice 2.

The base station 2 (target access network) may notify the core network when the UE starts accessing itself. In this process, the base station 2 (target access network) may notify the core network of information that the resource used for the network slice 1 is released. At the same time, based on i) the information that the UE previously requested network slice 2, but it was not activated, and ii) the information that the connection between the UE and the network slice 1 was released, the base station 2 (target access network) may request the core network to activate network slice 2 for the UE.

The AMF may recognize that the UE cannot use network slice 1 and can use network slice 2.

The AMF may instruct the SMF related to network slice 1 to deactivate the PDU session, and the AMF may instruct the SMF related to the network slice 2 to activate the PDU session.

The AMF may indicate to the UE that the network slice 1 cannot be used, and may instruct the use of the network slice 2 or inform that it can be used. The AMF may inform the UE that the UE can use the network slice 2 by activating the network slice 2.

Based on this, if the UE wants to use the service of network slice 2, the UE may request activation of network slice 2 to the network.

When the UE receives information (or instruction) from the network, the UE may perform an operation based on the information (or instruction).

Figure 11:
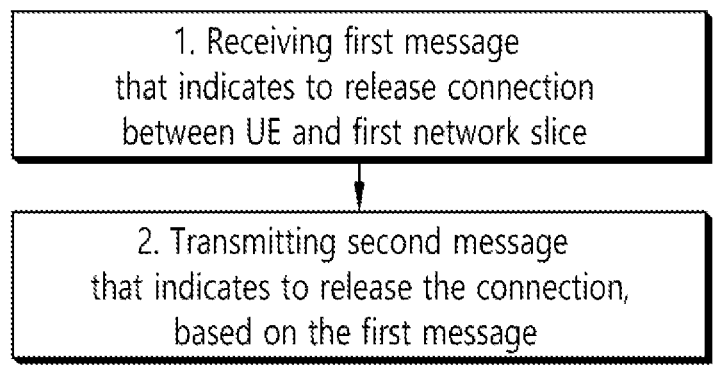
FIG. 11 shows a procedure of a UE according to the disclosure of the present specification.

FIG. 11 shows a procedure of a UE according to the disclosure of the present specification.

It may be determined that the connection between the UE and the network slice (network slice 1) used by the UE will be released while going through steps 1-3 in FIG. 9.

1. The UE may receive a message including information that network slice 1 can no longer be provided from the core network (AMF). The message may include information that the connection between network slice 1 and the UE will be released.

The core network may inform the release of network slice 1 and inform the UE what action to take based on the following information.

Information on applications (application 1) currently running in the UE: QoS requirements, region restriction information, etc.

Information on the network slice to be released (network slice 1)

When there is a network slice that can be newly provided to the UE, information on the network slice Information on frequencies configured for each network slice Information on frequency support of each terminal The UE may access the base station 2 in the new area, and may be provided with the network slice 2 in the new area. In this case, the AMF may transmit information on whether the UE can transmit and receive data of the application 1 using the network slice 2 to the UE.

In addition, the AMF may deliver information on a network slice to which the UE subscribes or a network slice allowed to the UE to the base station 1.

(1) When the UE Cannot Use Application 1 by Connecting to Network Slice 2

There may be case where there is no a network slice (network slice 2), which can satisfy QoS (latency, date rate, etc.) requirements of applications (application 1) operating in a network slice (network slice 1) to be released soon, among network slices that can be provided to a UE in a new area or there may be case where the application 1 cannot be provided to the UE in a new area (provided only in a specific area). In this case, the UE cannot use the application 1 by connecting to the network slice 2. That is, the UE cannot use application 1 anymore.

The AMF may transmit to the UE that the connection to network slice 1 may be released.

The AMF may transmit information indicating that data transmission of application 1 should be stopped to the UE. The AMF may instruct the UE to no longer request data transmission to the network for the corresponding application (application 1) using the corresponding network slice (network slice 1).

Such information (or instructions) may be transmitted through a notification or release message. In addition, the AMF may transmit information (release time) on when the connection to the network slice 1 will be released to the UE.

i) A case (where the network does not send the information that the network slice 2 is allowed to be used for the application 1) and ii) a case (where the network instructs to use only the network slice 1 for the application 1) may be same with a case where the network instructs not to transmit data for the application 1 in a new area. These cases may be included the described above case where the UE cannot use the application 1 via the network slice 2.

(2) When the UE can Use Application 1 by Connecting to Network Slice 2

There may be case where there is a network slice (network slice 2), which can satisfy QoS (latency, date rate, etc.) requirements of applications (application 1) operating in a network slice (network slice 1) to be released soon, among network slices that can be provided to a UE in a new area or there may be case where the application 1 can be provided to the UE in a new area (provided only in a specific area). In this case, the UE can use the application 1 by connecting to the network slice 2.

In this case, the core network (AMF) may instruct the UE to move from the network slice (network slice 1) to another network slice (network slice 2) for the application (application 1).

The AMF may inform the UE that the application 1 can be used through the network slice 2 in the new area.
    2. The UE may notify the application 1 based on the message received from the AMF.

(1) When the UE Cannot Use Application 1 by Connecting to Network Slice 2

The UE may notify the application that the network slice 1 will be released soon, and may stop data transmission for the application. When application 1 is installed for controlling the machine in the UE, application 1 may transmit, to the application installed in the machine being controlled, information indicating that it can no longer control the machine. Alternatively, application 1 may release the connection with the application installed on the machine. In addition, the application 1 may transmit information (release time) about the time the connection is maintained to the application installed in the machine.

The UE may deliver information (release time) on how long the UE's connection to the network slice 1 is maintained (when released) to the application 1. Through this process, the application can know when to take the action to terminate the application.

The UE may follow the instructions or configuration of the AMF included in the received message.

When the application 1 receiving the message from the UE is notified that communication may be cut off due to the release of the network slice 1, it may enter the procedure of finishing the operation currently in progress.

(2) When the UE can Use Application 1 by Connecting to Network Slice 2

The UE may adjust the parameters according to QoS provided by the network slice 2. For example, it is possible to change its own data generation interval based on information such as latency.

Figure 12:
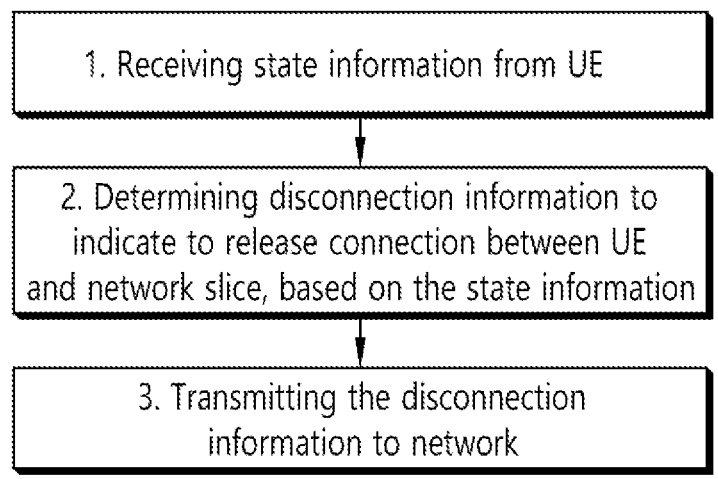
FIG. 12 illustrates a procedure of a base station according to the disclosure of the present specification.

FIG. 12 illustrates a procedure of a base station according to the disclosure of the present specification.
    1. The base station 1 may configure the measurement for the UE. The UE may continuously perform measurement according to this configuration, and when a certain condition is satisfied, the UE may report the measurement result to the base station 1.

The UE may transmit state information to the base station 1.

2. The base station 1 may analyze the measurement result received from the UE. As a result of analyzing the state information of the UE, the base station 1 may know that the connection with the network slice 1 being used by the UE will be released. Then, the base station 1 may determine the release information including such information.

The base station (base station 1) may manage information on the information (frequency/region/radio strength) of the area in progress for each network slice. Based on this information, the base station may recognize that the UE approaches an area where a specific network slice (network slice 1) can no longer be provided.

When the UE leaves the wireless network area of the base station 1 soon, the base station 1 may determine whether the network slice 1 provided to the UE can continue to be provided in the area to which the UE will move. In addition, the base station 1 may determine the time information (release time) for how long it can provide the network slice 1 to the UE. The time information may be included in the release information.

In addition, the base station may determine when the UE will perform handover, etc. according to the measurement result report of the UE.

3. If the base station 1 determines that network slice 1 will no longer be provided in a new area as a result of step 2, the base station 1 may inform the core network (AMF) of the result. That is, the base station 1 may transmit the above-described release information to the core network (AMF). For example, the UE is using the network slice 1 through the base station 1. According to the report of the measurement result of the UE, the UE may gradually move away from the wireless network area of the base station 1. In particular, if there is no cell providing the network slice 1 around the wireless network area of the base station 1, the base station 1 may inform the core network that the UE may soon leave the network slice 1 area. In addition, the base station 1 may notify the UE that the network slice 1 may be cut soon. It is possible to deliver information on the time (release time) when the connection to the network slice 1 is released to the core network.

AMF notifies SMF/UPF, etc. that the network slice of the terminal may be cut soon.

The description of the subsequent operation may be replaced with the contents of FIG. 9.

The specification may have various effects.

For example, through the procedure disclosed in the present specification, the UE may be provided with a service for safely and effectively releasing the connection to the network slice.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method. Other implementations are within the scope of the following claims.

What is claimed is:

1. A method comprising:
performing communication related to an application based on a first network slice;
receiving, from a network, a measurement configuration;
performing measurements based on the measurement configuration;
transmitting, to the network, a result of the measurements;
receiving, from the network, a first message including i) first information informing that the first network slice will be released, ii) second information informing a second network slice that can be provided to a user equipment (UE), and iii) time information informing time at which the first network slice is released; and
transmitting, to an entity related to the application, a second message informing that the first network slice will be released, based on the first message,
wherein, based on the second network slice not supporting the application, the second message includes the time information, and
wherein, based on the second network slice supporting the application, the second message includes information informing that the application is mapped to the second network slice and quality-of-service (QoS) information of the second network slice.

2. The method of claim 1,
wherein the first message includes third information instructing the UE to stop the communication related to the application based on the first network slice.

3. The method of claim 1,
wherein the first message includes fourth information on whether the communication related to the application can be performed based on the second network slice.

4. The method of claim 1,
wherein the network corresponds to an access and mobility management function (AMF).

5. A user equipment (UE) comprising:
at least one transceiver;
at least one processor; and
at least one memory operably connectable to the at least one processor and storing instructions that, based on being executed by the at least one processor, perform operations comprising:
performing communication related to an application based on a first network slice;
receiving, from a network, a measurement configuration;
performing measurements based on the measurement configuration;
transmitting, to the network, a result of the measurements;
receiving, from the network, a first message including i) first information informing that the first network slice will be released, ii) second information informing a second network slice that can be provided to the UE, and iii) time information informing time at which the first network slice is released; and
transmitting, to an entity related to the application, a second message informing that the first network slice will be released, based on the first message,
wherein, based on the second network slice not supporting the application, the second message includes the time information, and
wherein, based on the second network slice supporting the application, the second message includes information informing that the application is mapped to the second network slice and quality-of-service (QoS) information of the second network slice.

6. The UE of claim 5,
wherein the first message includes third information instructing the UE to stop the communication related to the application based on the first network slice.

7. The UE of claim 5,
wherein the first message includes fourth information on whether the communication related to the application can be performed based on the second network slice.

8. The UE of claim 5,
wherein the network corresponds to an access and mobility management function (AMF).

* * * * *